(12) United States Patent
Goblirsch et al.

(10) Patent No.: US 12,317,004 B1
(45) Date of Patent: May 27, 2025

(54) STREET LIGHT CONTROLLER WITH MICROWAVE TRANSMISSION

(71) Applicant: Special Services Group, LLC, Marina, CA (US)

(72) Inventors: Elizabeth A. Goblirsch, Moss Landing, CA (US); Andrew J. Ashworth, Camas, WA (US)

(73) Assignee: Special Services Group, LLC, Marina, CA (US)

( * ) Notice: Subject to any disclaimer, the term of this patent is extended or adjusted under 35 U.S.C. 154(b) by 0 days.

(21) Appl. No.: 18/532,803

(22) Filed: Dec. 7, 2023

Related U.S. Application Data

(63) Continuation-in-part of application No. 18/155,847, filed on Jan. 18, 2023, now Pat. No. 12,250,495.

(60) Provisional application No. 63/266,950, filed on Jan. 20, 2022.

(51) Int. Cl.
*H04N 7/18* (2006.01)
*H04N 23/695* (2023.01)

(52) U.S. Cl.
CPC ........... *H04N 7/185* (2013.01); *H04N 23/695* (2023.01)

(58) Field of Classification Search
CPC .............................. H04N 7/185; H04N 23/695
USPC ........................................................ 348/143
See application file for complete search history.

(56) References Cited

U.S. PATENT DOCUMENTS

| | | | |
|---|---|---|---|
| 5,469,431 A * | 11/1995 | Wendorf | ............... H04J 3/1605 725/138 |
| 5,886,738 A | 3/1999 | Hollenbeck et al. | |
| 6,160,353 A | 12/2000 | Mancuso | |
| 6,948,826 B2 | 9/2005 | Fogerlie | |
| 7,500,794 B1 | 3/2009 | Clark | |
| 7,723,862 B1 | 5/2010 | Spillman et al. | |
| 8,249,444 B2 | 8/2012 | Peterson et al. | |
| 8,382,387 B1 | 2/2013 | Sandoval | |
| 8,711,216 B2 | 4/2014 | Chien | |
| 8,820,961 B2 | 9/2014 | Kim | |
| 9,131,557 B2 | 9/2015 | Vadai et al. | |
| 9,335,750 B2 | 5/2016 | Lu et al. | |
| 9,575,394 B1 | 2/2017 | Wallace | |
| 9,593,843 B2 | 3/2017 | McRory | |
| 10,536,673 B2 | 1/2020 | Noone | |
| 10,544,932 B2 | 1/2020 | Gabriel et al. | |
| 11,365,879 B2 | 6/2022 | Leblanc et al. | |
| 2008/0191897 A1 | 8/2008 | McCollough | |
| 2008/0224849 A1 | 9/2008 | Sirhan | |
| 2009/0027498 A1 | 1/2009 | Owen et al. | |
| 2009/0237509 A1 | 9/2009 | Saxon | |
| 2011/0102587 A1 | 5/2011 | Zittel | |
| 2011/0141727 A1 | 6/2011 | Kim | |
| 2012/0081547 A1 | 4/2012 | Sitzmann et al. | |
| 2012/0113646 A1 | 5/2012 | Carmody | |
| 2012/0218421 A1 | 8/2012 | Chien | |
| 2013/0130522 A1 | 5/2013 | Mitchell et al. | |
| 2014/0009632 A1 | 1/2014 | Glover | |

(Continued)

*Primary Examiner* — Allen C Wong
(74) *Attorney, Agent, or Firm* — McHale & Slavin, P.A.

(57) ABSTRACT

Disclosed is a street light controller and concealed video surveillance system having a zoom lens mounted in a lamp head for securement to a modern street light having a NEMA socket. The video surveillance device is a single, compact unit consisting of a zoom camera with an internal recorder, microwave radio, and a control processor. The control processor allows for live video from a zoom camera, which can be transferred across a microwave network.

10 Claims, 8 Drawing Sheets

(56) References Cited

U.S. PATENT DOCUMENTS

| | | | |
|---|---|---|---|
| 2014/0313343 A1 | 10/2014 | Frank et al. | |
| 2015/0362172 A1* | 12/2015 | Gabriel | F21V 11/16 |
| | | | 348/151 |
| 2016/0150259 A1* | 5/2016 | Sokolov | H04N 21/234309 |
| | | | 725/27 |
| 2020/0195938 A1* | 6/2020 | Beck | H04N 19/184 |
| 2020/0383173 A1* | 12/2020 | Aaron | F21V 23/0435 |

* cited by examiner

STREET LIGHT CONTROLLER WITH MICROWAVE TRANSMISSION

PRIORITY CLAIM

In accordance with 37 C.F.R. 1.76, a claim of priority is included in an Application Data Sheet filed concurrently herewith. Accordingly, the present invention is a continuation-in-part of U.S. patent application Ser. No. 18/155,847 filed Jan. 18, 2023 entitled "STREET LIGHT CONTROLLER AND VIDEO SURVEILLANCE SYSTEM" which further claims priority based upon U.S. Provisional Patent Application No. 63/266,950 filed Jan. 20, 2022 entitled "STREET LIGHT CONTROLLER AND VIDEO SURVEILLANCE SYSTEM" the contents of which are incorporated herein by reference.

FIELD OF THE INVENTION

This invention is directed to the field of video surveillance systems; and in particular, to a compact video surveillance device concealed in a lamp head for use with modern street lights.

BACKGROUND OF THE INVENTION

Video surveillance systems are known in the industry. A common location to install a video surveillance system is on conventional light poles found along streets, highways and intersections. The light poles are used to position a light at a distance above road level, illuminating the surrounding area after darkness. Modern light poles further employ a light sensor, also commonly referred to as a photo controller or photo sensor, for operation of the light during darkness and low level light conditions. The sensor is based on the photoelectric effect principle of semiconductors, wherein a photoelectric device converts photons to electrons to complete an electrical circuit that powers the light. The sensor provides efficiency in operation so as to draw electricity only when needed, extending the life of the lighting element.

Conventional light pole assemblies utilize a NEMA power socket for receipt of the sensor assembly; the sensor being a replaceable device. Prior art recognizes the use of the NEMA power socket as a convenient way of powering a video surveillance system in combination with a photo sensor. The sensor operates a light based upon ambient lighting conditions, the video surveillance system drawing power from the NEMA socket, Known video surveillance systems use one or more fixed length camera lens requiring multiple windows. Fixed length camera lenses limit the quality of the image based upon the distance an object or individual is removed from the camera. Still other known devices lack a recorder onboard, making them inefficient for law enforcement surveillance operations.

What is lacking in the art is a combined light sensor and video surveillance device that allows live video transfer without complex devices tethered to the device, wherein a zoom lens can be remotely controlled to provide optimum clarity.

SUMMARY OF THE INVENTION

Disclosed is a compact video surveillance system consisting of a pan, tilt and ZOOM camera with internal recorder, and microwave radio designed covertly as a common electronic photo controller for use on modern street lights having NEMA socket. The device has one window and an extremely small form factor that allows for surreptitious law enforcement deployments on streetlights where photo controllers are normally located. The device offers full pan, tilt and zoom capability for viewing, along with a microwave radio which alternately allows live video to be transferred across the microwave network. An internal recorder is also included for edge video storage. In addition, the device takes its power from the streetlight socket and replaces the functionality of the original photo controller, turning the street light off and on based on the ambient lighting conditions.

An objective of the invention is to provide a street light mounted surveillance system comprising a zoom camera, pan & tilt mechanism, an encoder, a video recorder and a microwave radio capable of transmission and reception as point-to-point, point-to-multipoint or mesh network.

Another objective of the invention is to provide a microwave radio element encased in a machined metal housing that serves as a heatsink as well as a mounting bracket. This heat sink bracket incorporates a fan for forced air cooling.

Still another objective of the invention is to provide street light controller and surveillance system that can use a network connection via the microwave radio.

Still another objective of the invention is to provide a compact video surveillance device having a camera with zoom capability.

Yet still another objective of the invention is to provide a compact surveillance device having an internal recorder to allow for video storage, Another objective of the invention is to provide streaming video that can be viewed live on video walls, PC's, and handheld mobile devices.

Yet still another objective of the invention is to provide a compact video surveillance device to provide an adjustable, low bandwidth, video feed over high-quality microwave networks.

Still another objective of the invention is to employ the exhaust air from a heat sink to remove condensation from the lens assembly during operation in cold weather.

An advantage of this system is that radios from a range of suppliers can be integrated, offering operation in multiple modulation multiple frequency bands and utilizing techniques.

Other objectives and further advantages and benefits associated with this invention will be apparent to those skilled in the art from the description, examples and claims which follow.

DESCRIPTION OF THE PREFERRED EMBODIMENT

Figure 1:
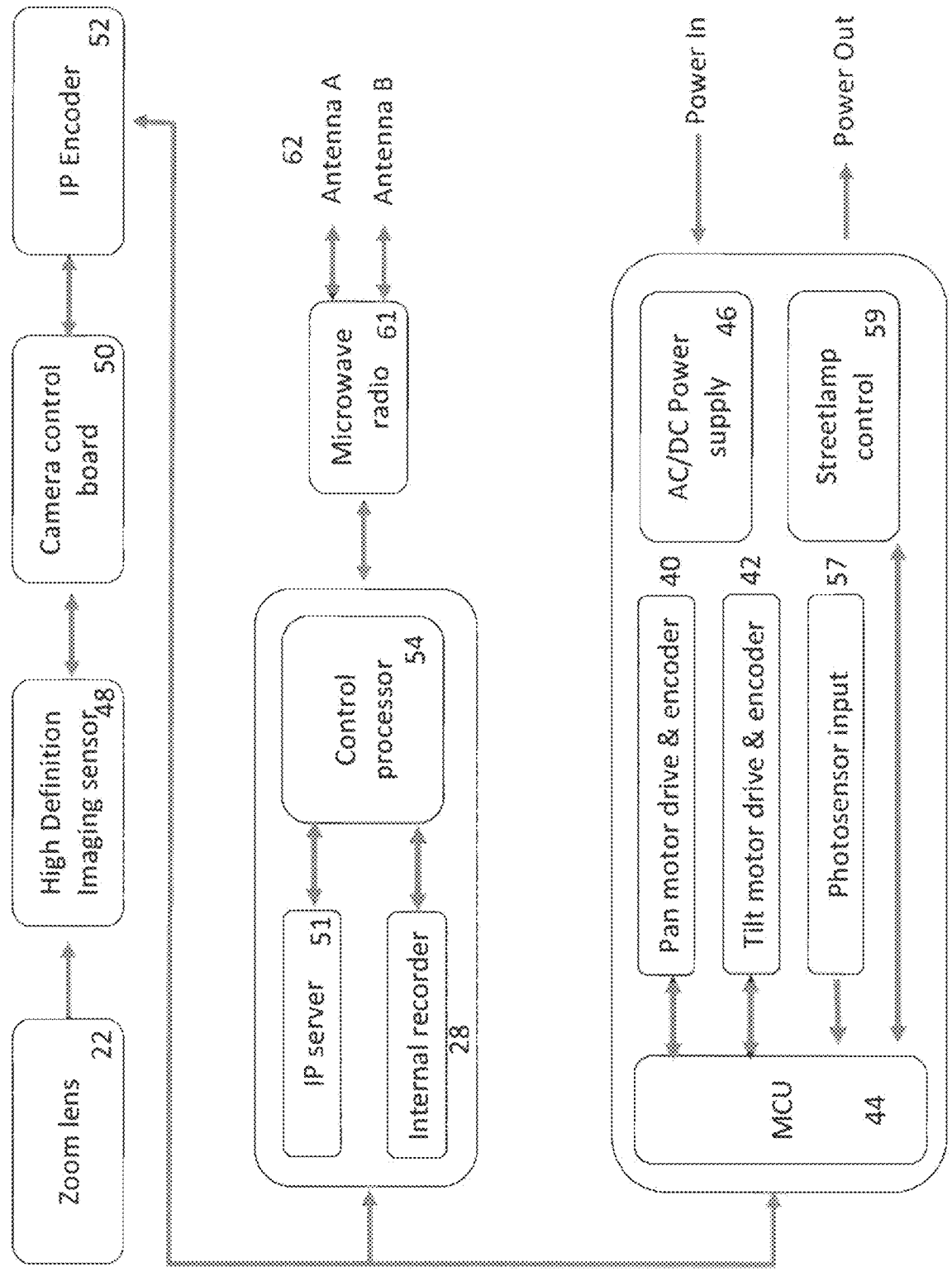
FIG. 1 is a block diagram listing the components of the street light controller and video surveillance system of the instant invention.
Figure 2:
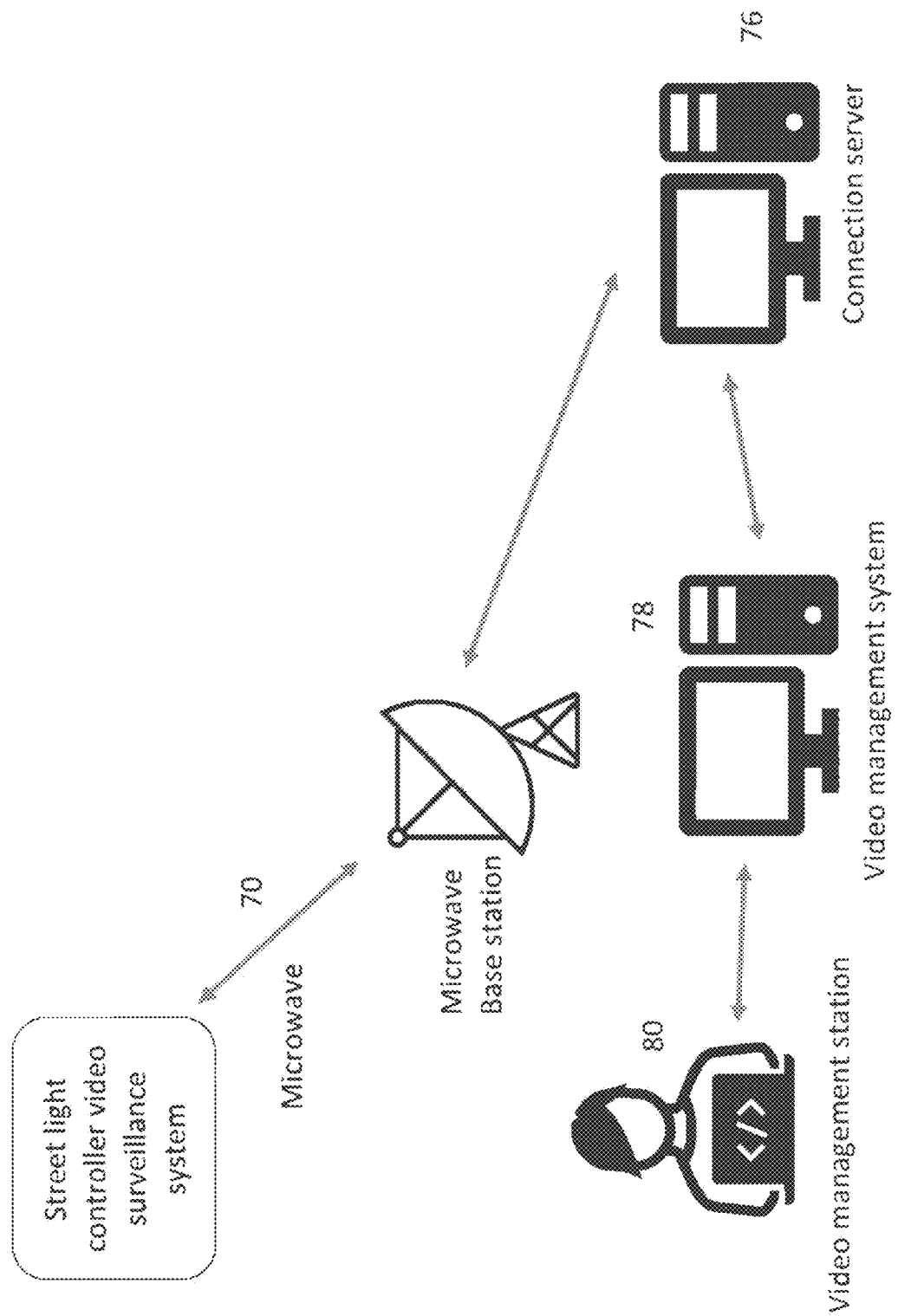
FIG. 2 is a flow diagram illustrating the interconnectivity of the instant invention through microwave connections to a management station.
Figure 3:
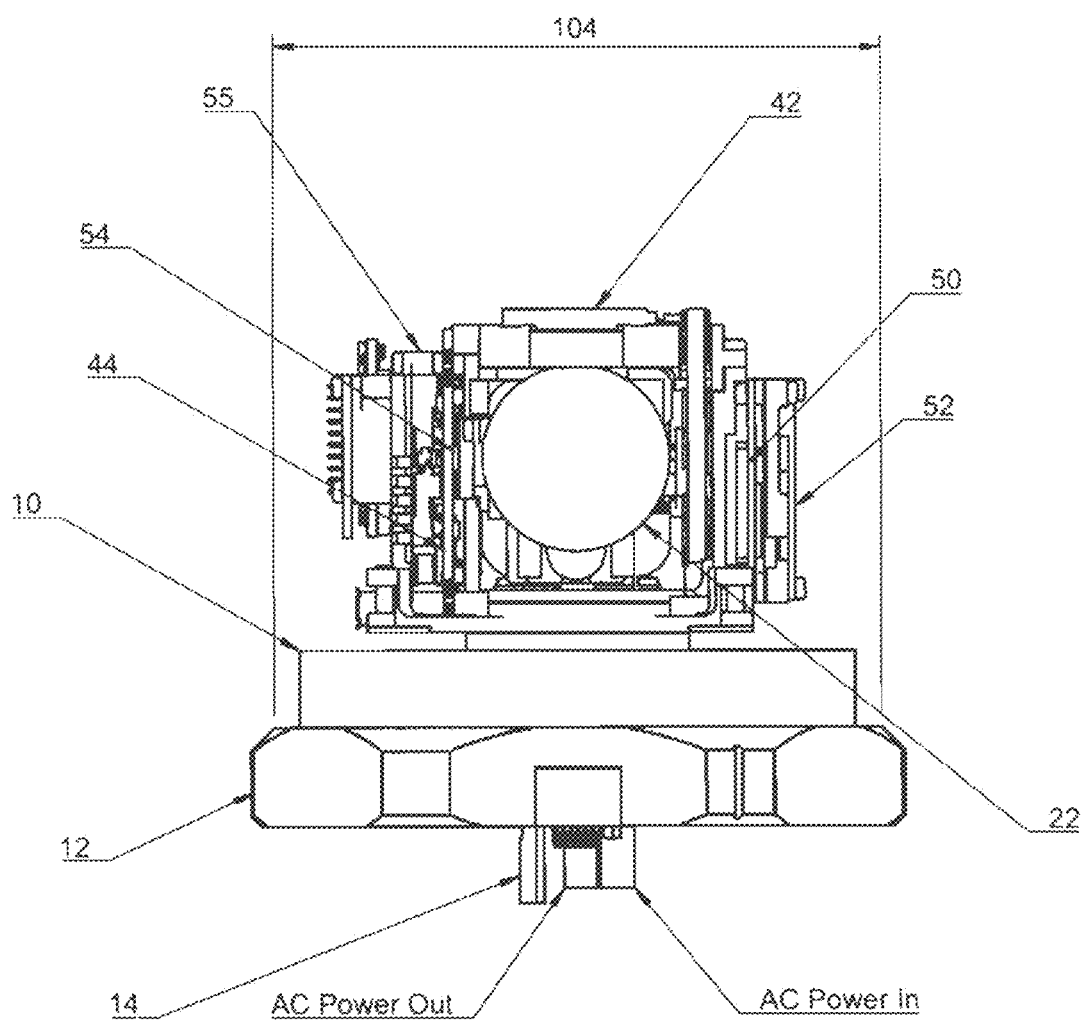
FIG. 3 is a front view of the street light controller and video surveillance device.
Figure 4:
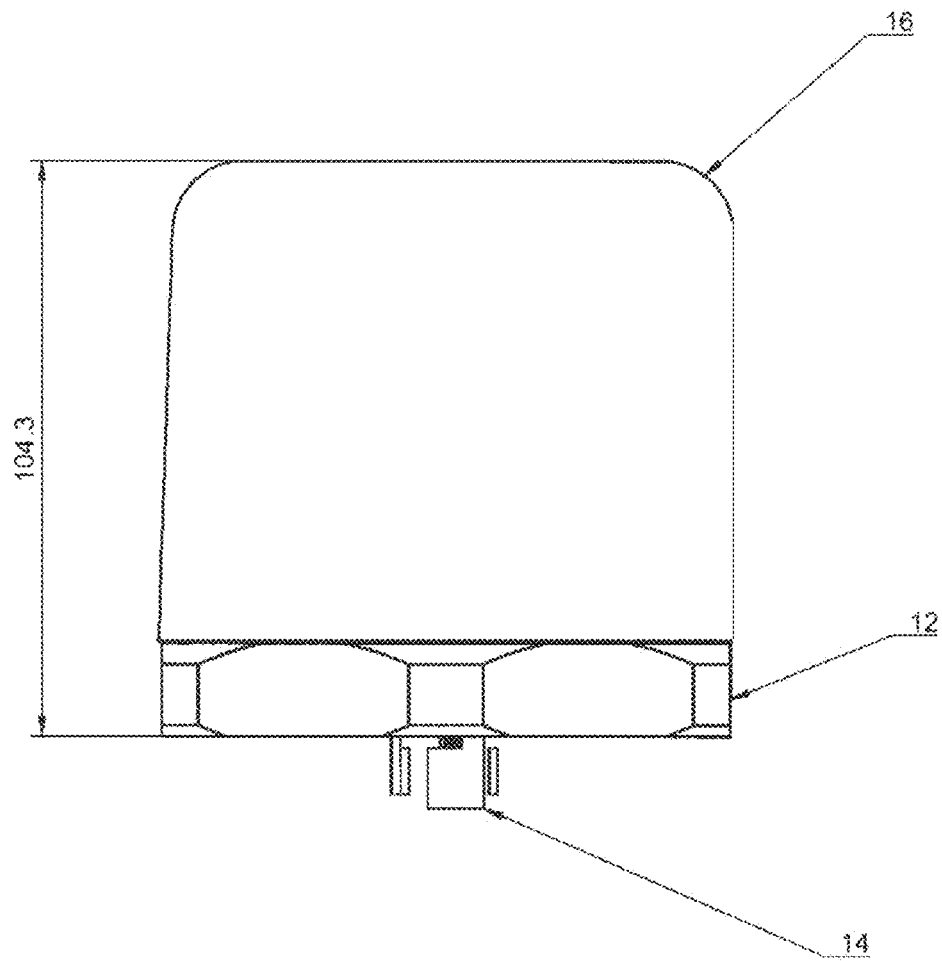
FIG. 4 is a rear view thereof.
Figure 5:
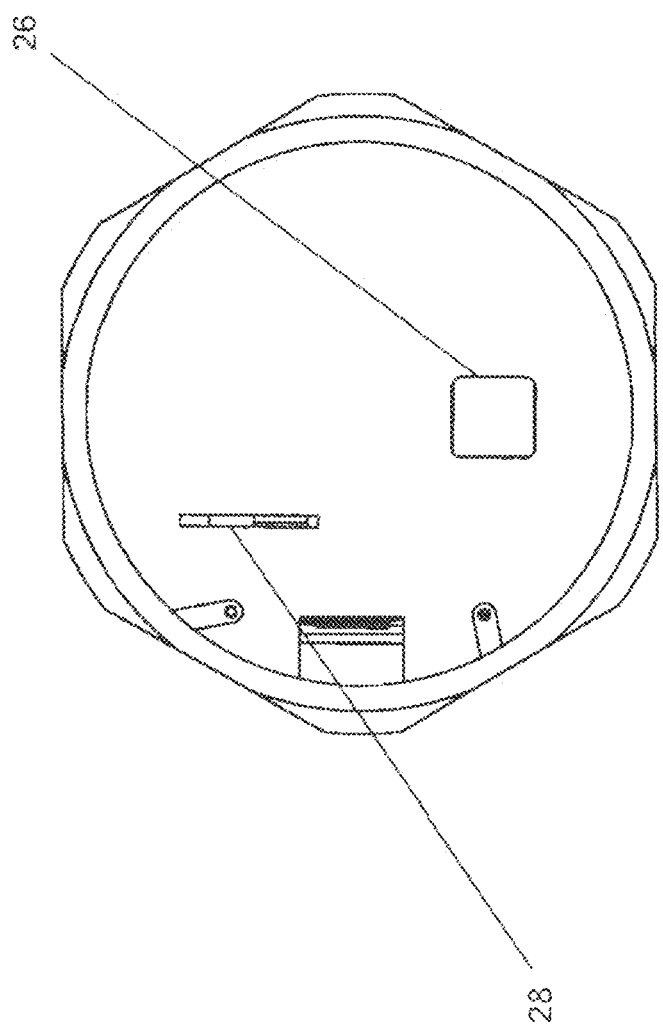
FIG. 5 is a top view thereof.

An embodiment of the instant invention is disclosed herein, however, it is to be understood that the disclosed embodiments are merely exemplary of the invention, which may be embodied in various forms. Therefore, specific functional and structural details disclosed herein are not to be interpreted as Limiting, but merely as a basis for the claims and as a representation basis for teaching one skilled in the art to variously employ the present invention in virtually any appropriately detailed structure.

Referring to the Figures, in a preferred embodiment a street light controller and video surveillance system includes a Camera consisting of a zoom lens 22 coupled to a high-definition imaging sensor 48 and control board 50. The camera produces a video output. The IP encoder 52 takes this signal, and encodes it to industry standard IP video. This IF stream is ingested by the control board having a shape and dimensions being constructed and arranged to fit within a rotatable enclosure 18.

The IP stream is configured by the controller to a rate low enough to be passed economically over microwave connections via microwave radios. In addition to the streaming function, the surveillance system provides internal video recording using an internal recorder 28, and hosts a microwave radio 61 designed to transmit electromagnetic waves in the microwave frequency range, typically between 1 gigahertz (GHz) to 300 gigahertz (GHz).

Within the enclosure 18 is a control processor which is connected to a microwave radio 61. The video surveillance system offers direct integration into VMS systems by an IP compatible interface. All settings are available to a user by a server webpage.

In operation, the video is sent over the microwave network to a server at the customer's location. This server provides the video to the user's video management system. One of the functions of a video management system is to provide a control interface for the remote camera. In this case, the pan, tilt and zoom functions of the device are fully controllable. When the user generates a zoom command at the video management system station, the command is transferred back through the chain to the camera. Initially, the command is received by the server; this passes the command to the selected device embodiment, a street light controller and video surveillance system via the microwave link. The system extracts this command from the IP stream and addresses it directly to the processor on the IP encoder. This system then translates the command and passes it to the camera control board 50, which directly actuates the zoom lens 22. When the user generates a pan or tilt command at the video management system station, the command is transferred back through the chain to the device. Initially, the command is received by the server; this passes the command to the selected device via the microwave link. The control processor 54 extracts this command from the IP stream, converts it and passes it to the motion control microcontroller 44. This integrated circuit drives the required motors 40, 42 in the required direction at the required speed, Speed and position are constantly monitored by encoders, allowing the system to both save and recall preset positions when commanded to do so by the user.

The camera offers a zoom capability, the control processor 54 with microwave radio 61 allows for live video to be transferred across the microwave network, and the internal recorder 28 allows for long term video storage for ease of retrieval.

Referring to FIGS. in general, illustrated is the street light controller and video surveillance device 10 having a base 12 with a NEMA plug 14 extending therefrom. An upper section 16 comprises a cap 18 forming an extended radome to fully enclose the streetlight controller and surveillance device 10 and microwave cap 19.

Secured to the base of the heatsink bracket 21 is a shroud 23 that mounts band specific antennas, s 62 used for the microwave radio. These antennas can both be the same band in the case of a mesh or time domain multiplexed topology network or different frequency bands in the case of point-to-point or point-to-multipoint bidirectional networks.

A window 20 conceals a zoom lens 22. In the preferred embodiment, the diameter of the cap 18 is about 104 mm and the height including base is about 104 mm. A microwave cap 19 fits within the cap upper section 16 formed from a machined radio heatsink 21 attached to an antenna support 23 to carry microwave antennas.

Figure 6:
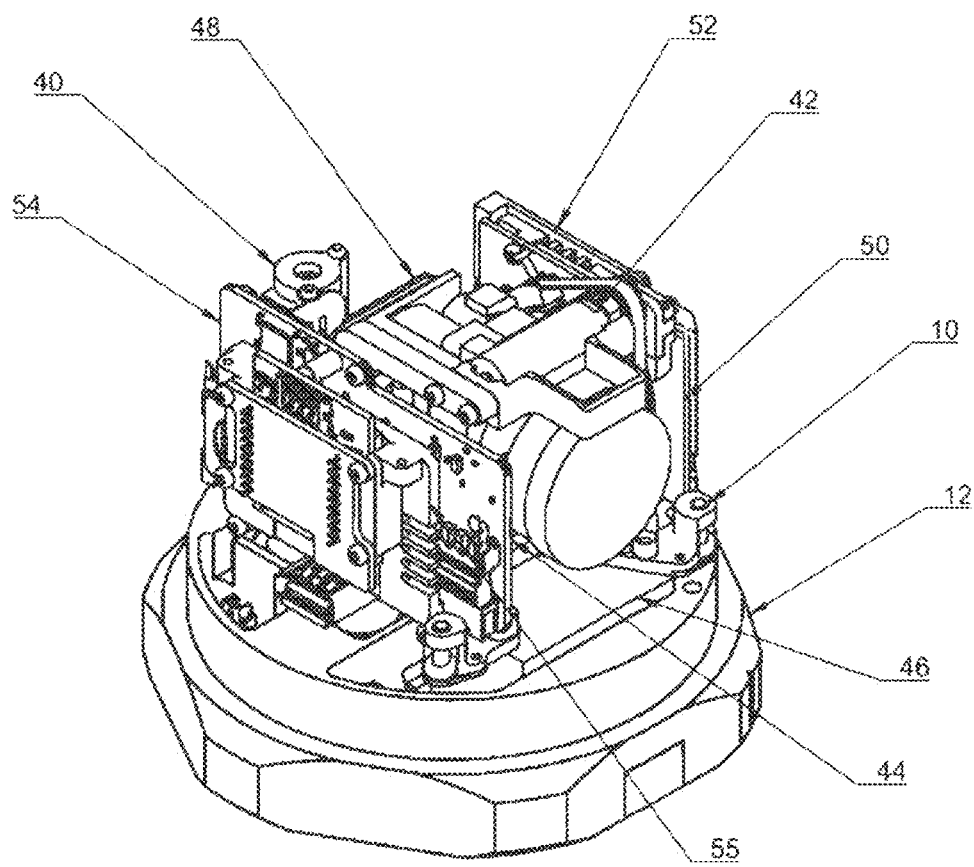
FIG. 6 is a perspective view of the street light controller and video surveillance device with the top enclosure removed.
Figure 7:
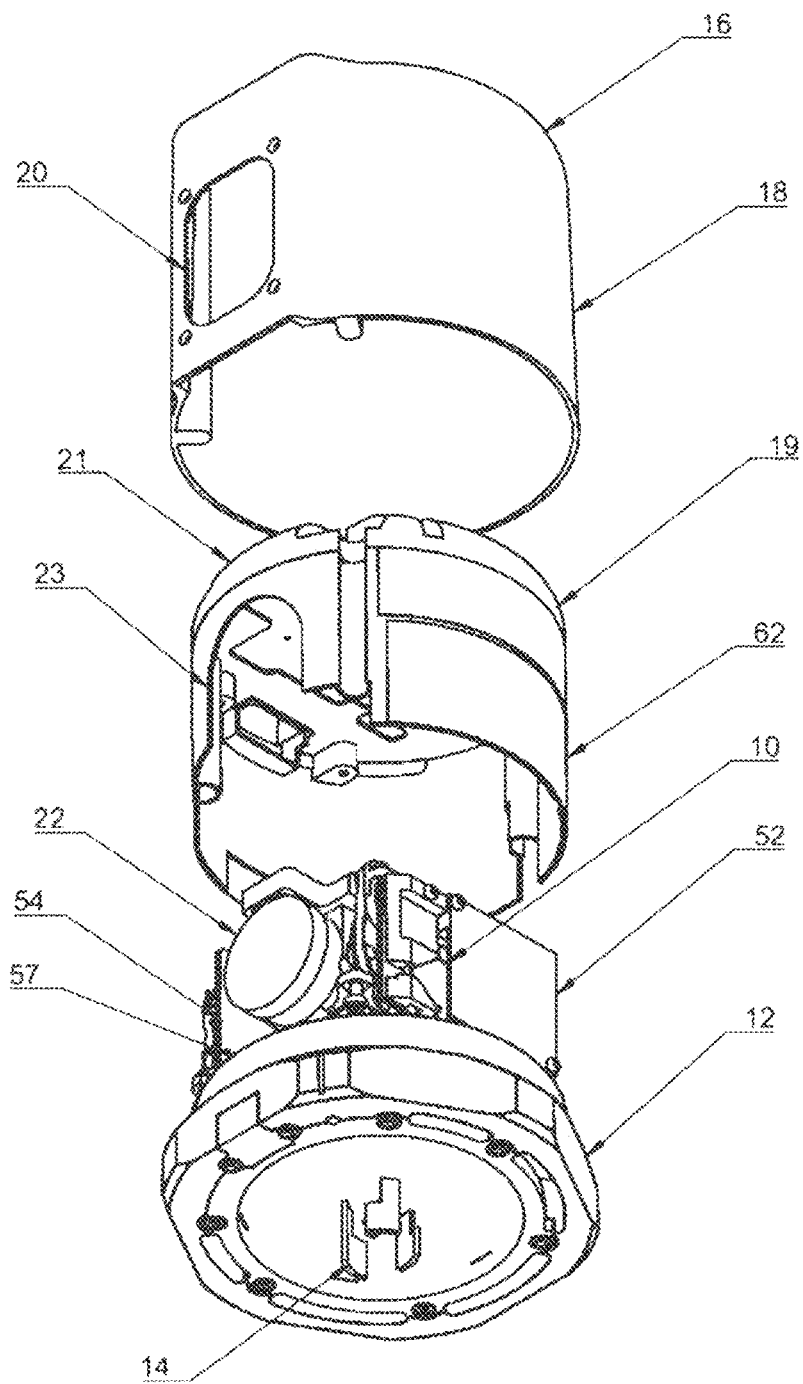
FIG. 7 is an exploded view of the street light controller 10, microwave cap 19 and cap upper section 16.
Figure 8:
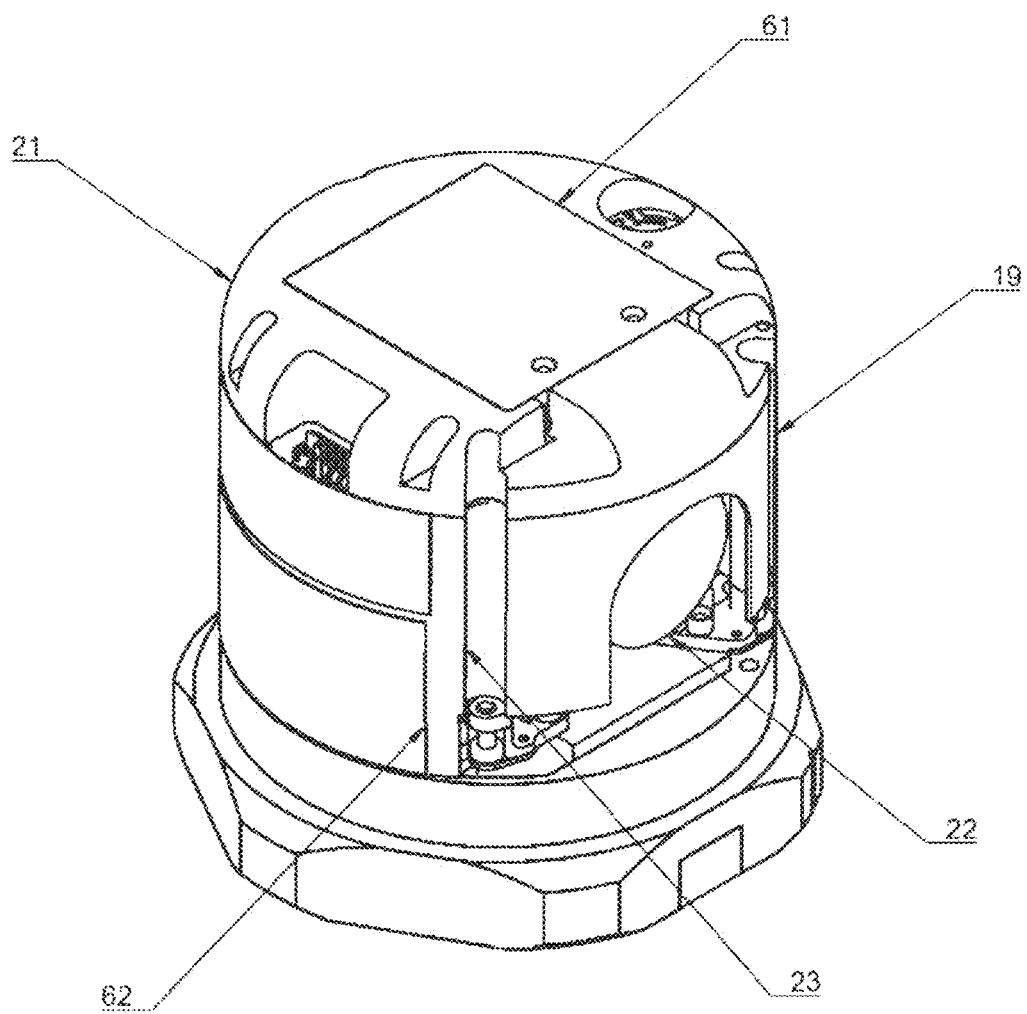
FIG. 8 is a view of the street light controller and video surveillance device 10 with microwave cap 19 fitted.

Referring to FIG. 6, the street light controller and video surveillance device 10 with the enclosure 18 and microwave cap 19 removed illustrates the positioning of the pan motor 40 and tilt motor 42. A motion control microcontroller 44 is electrically coupled to an AC/DC power supply 46. The zoom lens 22 is coupled to the high-definition imaging sensor 48 and camera control board 50 including an IP Encoder 52. Images are directed through a control processor 54 connected to the microwave radio 61.

The compressed video 70 is sent either over the microwave network to a server 76 at the customer's location. This server provides the video to the user's video management system 78 for viewing and control by the user 80.

In addition to the above functions, the motion control microcontroller 44 also reads the ambient light level as measured by a photo sensor 57. This measurement is used as the input of an algorithm to calculate when the power should be turned on to the street lamp to illuminate it. This AC switching is commanded by the motion control microcontroller 44 via a streetlamp control 59 having a solid state relay. The control processor 54 is mounted to a heat sink 55.

The heat sink 55 draws air in and, using a fan, transfers air through the heat sink 55 to dissipate heat from the components. The resulting hot air is vented across the front of the lens 22 to clear any fog or condensation from the lens 22.

Similarly the microwave radio heatsink 21, mounted above the street light controller and surveillance device 10, draws air through the heatsink using an integrated fan and vents this hot air across the front of the lens 22 to clear any fog or condensation in cool conditions.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "contains" "has," "includes" or one or more features, possesses those one or more features, but is not limited to possessing only those one or more features. Furthermore, a device or structure that is configured in a certain way is configured in at least that way, but may also be configured in ways that are not listed. The term "about" or "generally about" means, in general, the stated value plus or minus 5%.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein, One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A video surveillance system for a street light having a NEMA socket coupled to a power source, said video surveillance system comprising:
   an enclosure releasably securable to the NEMA socket;
   a camera positioned within said enclosure and electrically coupled to the power source, said camera forming a video output;
   an encoder for receipt of said video output and encoding the video output for onward transmission;
   a modem or radio for transfer of said video through a microwave connection;
   a photosensor positioned within said enclosure providing an electrical coupling between the power source and the street light to replace the functionality of a photo controller for automatic lighting;
   a microwave radio coupled to said video stream;
   wherein video from said camera is sent over a microwave network to a server at a remote location as an IP stream to a user's video management system for video surveillance.

2. The video surveillance system according to claim 1 wherein said camera is a high definition imaging sensor.

3. The video surveillance system according to claim 1 including a motion control microcontroller coupled to a motor for panning and a motor for tilting said camera, wherein the system obtains remote control directions which are extracted from the ONVIF stream and converted to RS232 which is passed to the motion control microcontroller for driving a required motor in a required direction at a speed, wherein speed and position are constantly monitored by encoders, allowing the system to both save and recall preset positions when commanded to do so by the user.

4. The video surveillance system according to claim 1 wherein microwave cap is a machined aluminum radio heatsink.

5. The video surveillance system according to claim 1 wherein said modem is a microwave or LTE modem.

6. The video surveillance system according to claim 1 wherein said camera includes a 10× optical zoom.

7. The video surveillance system according to claim 1 including a GPS receiver and antenna positioned within said enclosure, said GPS receiver providing coordinates as to the location of the video output obtained from said surveillance system.

8. The video surveillance system according to claim 1 wherein said camera includes internal video recording for storage on a SD card.

9. The video surveillance system according to claim 1 wherein said enclosure is rotatable and generally 112 mm in diameter and generally 87 mm in height.

10. The video surveillance system according to claim 1 including a heat sink with a fan positioned adjacent a compressor for directing air through said enclosure to dissipate heat from the components and further direct the heat to dissipate condensation from the lens.

* * * * *